United States Patent
Venkataramani et al.

(10) Patent No.: US 7,252,789 B2
(45) Date of Patent: Aug. 7, 2007

(54) HIGH-DENSITY SCINTILLATORS FOR IMAGING SYSTEM AND METHOD OF MAKING SAME

(75) Inventors: Venkat Subramaniam Venkataramani, Clifton Park, NY (US); Steven Jude Duclos, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 180 days.

(21) Appl. No.: 11/094,904

(22) Filed: Mar. 31, 2005

(65) Prior Publication Data

US 2006/0219927 A1    Oct. 5, 2006

(51) Int. Cl.
C09K 11/08    (2006.01)

(52) U.S. Cl. .................. 252/301.4 R; 250/363.03; 250/363.04; 378/19; 378/98.8

(58) Field of Classification Search ........... 250/370.11, 250/370.12
See application file for complete search history.

(56) References Cited

U.S. PATENT DOCUMENTS

| | | | |
|---|---|---|---|
| 4,242,221 A * | 12/1980 | Cusano et al. ............ 264/1.21 |
| 4,559,597 A * | 12/1985 | Mullani ..................... 600/407 |
| 6,630,077 B2 * | 10/2003 | Shiang et al. ......... 252/301.4 R |
| 6,706,212 B2 * | 3/2004 | Venkataramani et al. ................... 252/301.4 F |
| 6,793,848 B2 | 9/2004 | Vartuli et al. ......... 252/301.4 R |
| 2002/0195587 A1 * | 12/2002 | Srivastava et al. .... 252/301.4 R |
| 2003/0094596 A1 * | 5/2003 | Kijima et al. ......... 252/301.4 R |
| 2004/0079956 A1 * | 4/2004 | Kummer et al. ............. 257/100 |
| 2004/0084655 A1 * | 5/2004 | Vartuli et al. ......... 252/301.4 R |

FOREIGN PATENT DOCUMENTS

| WO | WO2004/044613 A2 | 5/2003 |
| WO | WO2004/019059 A1 | 3/2004 |

OTHER PUBLICATIONS

Humm, John L., Anatoly Rosenfeld, and Alberto Del Guerra. "From PET Detectors to PET scanners." European Journal of Nuclear Medicine and Molecular Imaging. vol. 30, No. 11 (2003): pp. 1578-1580.*

Lu, Jianren, Jie Song, Mahendra Prabhu, Jianqiu, Ken-ichi Ueda and Hideki Yagi. "High-Powered Nd:Y3Al5O12 Ceramic Laser". Japanese Journal of Applied Physics. vol. 39 (2000): pp. L1048-L1050.*

(Continued)

*Primary Examiner*—David Porta
*Assistant Examiner*—Casey Bryant
(74) *Attorney, Agent, or Firm*—Fletcher Yoder

(57) ABSTRACT

A scintillator composition comprising a garnet represented by $(M_{1-x-y}N_xA_y)_3(Al_{5-a-b}C_aD_b)O_{12}$, where M comprises yttrium, or terbium, or gadolinium, or holmium, or erbium, or thulium, or ytterbium, or lutetium, or combinations thereof, where N comprises additives including a lanthanide, or an alkali metal, or an alkaline earth metal, or combinations thereof, where A comprises a suitable activator ion including cerium, or europium, or praseodymium, or terbium, or ytterbium, or combinations thereof, where C or D comprises lithium, or magnesium, or gallium, or an element from group IIIa, or IVa, or Va, or IIId transition metal, or IVd transition metal, or combinations thereof, where x ranges from about 0 to about 0.90, y ranges from about 0.0005 to about 0.30, and a sum of a and b ranges from about 0 to 2.0.

21 Claims, 7 Drawing Sheets

OTHER PUBLICATIONS

Rocha, J. G., C. G. J. Schabmueller, N. F. Ramos, S. Lanceros-Mendez, M. F. Costa, A. G. R. Evans, R. F. Wolffenbuttel and J. H. Correia. "X-ray Detector Based on a Bulk Micromachined Photodiode Combined with a Scintillating Crystal". Journal of Micromechanics and Microengineering. 13 (2003): pp. S45-S50.*

* cited by examiner

HIGH-DENSITY SCINTILLATORS FOR IMAGING SYSTEM AND METHOD OF MAKING SAME

BACKGROUND

The invention relates generally to imaging systems. In particular, the invention relates to a scintillator for use in an imaging system and a method of making the same.

Positron emission tomography (PET) is a medical imaging technique in which a radioactive substance is administered to a patient and then traced within the patient's body by means of an instrument that detects the decay of the radioactive isotope. In PET, a chemical tracer compound having a desired biological activity or affinity for a particular organ is labeled with a radioactive isotope that decays by emitting a positron. The emitted positron loses most of its kinetic energy after traveling only a few millimeters in a living tissue. It is then highly susceptible to interaction with an electron, an event that annihilates both particles. The mass of the two particles is converted into 1.02 million electron volts (1.02 MeV) of energy, divided equally between two 511 keV photons (gamma rays). The two photons are emitted simultaneously and travel in almost exactly opposite directions. The two photons penetrate the surrounding tissue, exit the patient's body, and are absorbed and recorded by photodetectors typically arranged in a circular array. Biological activity within an organ under investigation can be assessed by tracing the source of the radiation emitted from the patient's body to the photodetectors.

The value of PET as a clinical imaging technique is in large measure dependent upon the performance of the photodetectors. Each photodetector comprises a scintillator cell or pixel coupled to photomultiplier tubes. The scintillator cell produces light at these two points that is sensed by the photomultiplier tubes. The electrical signals from the photomultiplier tubes are processed to produce an image of the patient's organ. The two photons, generated from annihilation of the positron, strike the scintillator cell at two points separated by 180 degrees. In other words, approximate simultaneous interaction of the photons on the scintillator cell indicates the presence of a positron annihilation along the line joining the two points of interaction. By measuring the slight difference in arrival times of the two photons at the two points in scintillator cell, the position of positron can be calculated.

The limitations of this time difference measurement are highly dependent on the stopping power, light output, and decay time of the scintillator material. Stopping power is the ability to stop the 511 keV photons in as little material as possible so as to reduce the overall size of the photodetectors and, therefore, enhance the light collection efficiency and energy resolution. The stopping power is typically expressed as the linear attenuation coefficient $\tau$ having units of inverse centimeters ($cm^{-1}$). After a photon beam has traveled a distance x in a scintillator material, the proportion of photons that has not been stopped by the scintillator material is $\exp(-\tau \cdot x)$. Thus, for a good scintillator material, $\tau$ should be as large as possible. High light output is important because the photodetectors will have higher sensitivity and, thus, the dose of the radioactive material administered to the patient can be reduced. Decay time (or also known as time constant, decay constant, or primary speed) is a measure of how fast the scintillator material stops emitting light after a cessation of excitation by the 511 keV photon. Short decay time allows for more rapid scanning and, thus, better observation of the motion of the body's organs.

Known scintillator materials for PET are bismuth germanate ($Bi_4Ge_3O_{12}$ or "BGO"), Lutetium orthosilicate (LSO) and thallium-doped sodium iodide (NaI:Tl), NaI:Tl has a reasonable stopping power but a long decay constant of about 250 nsec (nanoseconds). BGO has a relatively good stopping power but a relatively low light output and a long decay constant of about 300 nsec.

Although lutetium silicate (LSO) offers good light yield and decay times, these scintillator materials are costly and difficult to fabricate. As a result, they are not economically viable for large area detector assemblies for a total body scanner using these scintillators.

Accordingly, there is a need for a suitable scintillator that addresses some or all of the problems set forth above.

BRIEF DESCRIPTION

In certain embodiments, the present technique provides a scintillator composition. The scintillator composition includes a garnet represented by $(M_{1-x-y}N_xA_y)_3(Al_{5-a-b}C_aD_b)O_{12}$, where M includes yttrium, or terbium, or gadolinium, or holmium, or erbium, or thulium, or ytterbium, or lutetium, or combinations thereof, where N includes additives including a lanthanide, or an alkali metal, or an alkaline earth metal, or combinations thereof, wherein A comprises a suitable activator ion including cerium, or europium, or praseodymium, or terbium, or ytterbium, or combinations thereof, and where D includes lithium, or magnesium, or gallium, or an element from group IIIa, or IVa, or Va, or IIId transition metal, or IVd transition metal, or combinations thereof. Further, x ranges from about 0 to about 0.90, y ranges from about 0.0005 to about 0.3, and a sum of a and b ranges from about 0 to 2.0.

In another embodiment, the present technique provides a method of manufacturing a scintillator composition. The method includes providing a garnet represented by $(M_{1-x-y}N_xA_y)_3(Al_{5-a-b}C_aD_b)O_{12}$ and compacting the garnet composition.

In further embodiment, the present technique provides a detector element of an imaging system having a scintillator composition of the present technique. The scintillator composition includes a garnet represented by $(M_{1-x-y}N_xA_y)_3(Al_{5-a-b}C_aD_b)O_{12}$.

In another embodiment, the present technique provides an imaging system having a scintillator composition of the present technique. The scintillator composition includes a garnet represented by $(M_{1-x-y}N_xA_y)_3(Al_{5-a-b}C_aD_b)O_{12}$.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
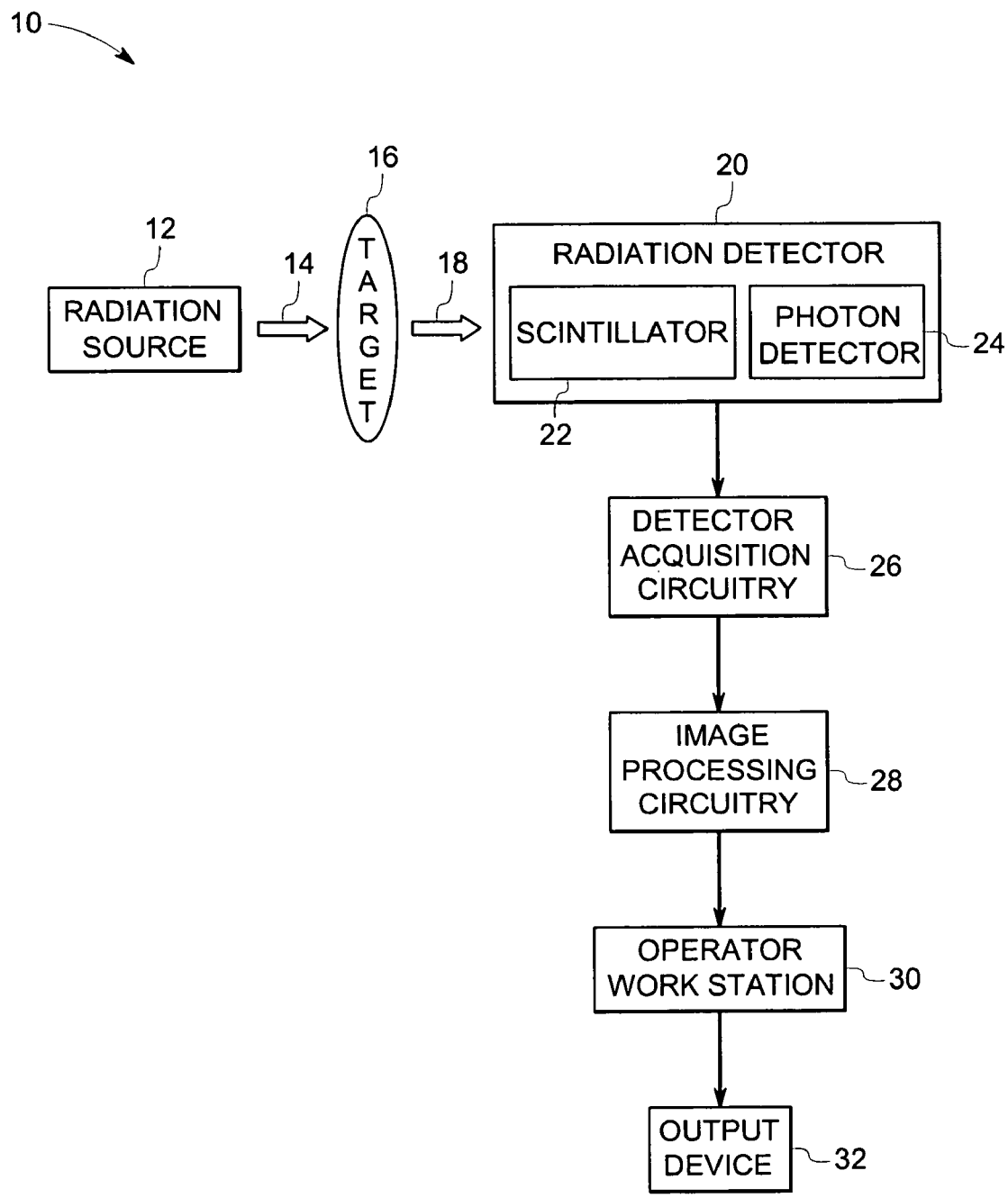
FIG. 1 is a diagrammatical representation of an exemplary radiation-based imaging system employing a garnet scintillator according to certain embodiments of the present technique.

FIG. 1 illustrates an exemplary radiation-based imaging system, such as positron emission tomography, in accordance with certain embodiments of the present technique. In the illustrated embodiment, the imaging system 10 includes a radiation source 12 positioned such that a major portion of the radiation 14 emitted from the radiation source 12 passes through the target 16, such as an animal, or a human, or a baggage item, or any target having internal features or contents. In certain embodiments, the radiation 14 may include electromagnetic radiation such as, x-ray radiation, or beta radiation, or gamma radiation. A portion of the radiation 14, generally termed as attenuated radiation 18, passes through the target 16. More specifically, the internal features of the target 16 at least partially reduce the intensity of the radiation 14. For example, one internal feature of the target 16 may pass less or more radiation than another internal feature.

Subsequently, the attenuated radiation 18 impinges on one or more radiation detectors 20, which include a scintillator 22 that produces visible photons in response to the impinging attenuated radiation on its surface. As will be appreciated by those skilled in the art, a garnet scintillator is a scintillator material having a garnet crystal structure. As described in detail below, a garnet crystal structure is generally represented by a chemical formula $A_3B_5O_{12}$, where A is a large ion, mainly from the lanthanide rare earth series, and B is a relatively smaller ion from the lanthanide series, alkaline earth metal series, and other smaller ions like aluminum, chromium, iron and the like. Garnet crystal structure has three different types of lattice sites, dodecahedral, octahedral, and tetrahedral, for possible occupation by ions. Further, the number of dodecahedral, octahedral and tetrahedral sites in the garnet crystal structure is 3, 3, and 2, respectively. Dodecahedral sites accept large ions, whereas octahedral and tetrahedral sites accept smaller ions. As will be appreciated by those skilled in the art, dodecahedral sites have a coordination number of 12, octahedral site have a coordination number of 6 and tetrahedral sites have a coordination number of 4. Thus, the garnet crystal structure presents numerous possibilities for the sites to be filled by different ions.

In certain embodiments, the scintillator composition may include a garnet represented by a chemical formula $(M_{1-x-y}N_xA_y)_3(Al_{5-a-b}C_aD_b)O_{12}$. In these embodiments, x may range from about 0 to about 0.90, y may range from about 0.0005 to about 0.3, and a sum of a and b may vary from about 0 to about 2.0. In an exemplary embodiment, the x may range from about 0.05 to about 0.75, and y may range from about 0.005 to about 0.9 and each of a and b may range from about 0 to about 2 such that the sum of a and b ranges from about 0 to about 2. In some embodiments, M may include a lanthanide series rare earth element, such as yttrium, or terbium, or gadolinium, or holmium, or erbium, or thulium, or ytterbium, or lutetium, or combinations thereof. In certain embodiments, N may be an additive including a lanthanide, or an alkali metal, or an alkaline earth metal, or combinations thereof. In some embodiments, N may include monovalent ions of alkali metals such as sodium, or potassium, or rubidium, or cesium, or combinations thereof. In other embodiments, N may include alkaline earth metal ions such as calcium, or strontium, or barium. As discussed in detail below, smaller alkali metal ions or smaller alkaline earth metal ions such as lithium, magnesium and beryllium may be employed to substitute aluminum. In these embodiments, the additive may be added to facilitate higher sintered density of the scintillator upon compaction, as described in detail below. Moreover, additives may facilitate optimization of the crystal field environment to enhance scintillation efficiency and reduce rise and decay times of the scintillator composition, thereby facilitating effective proton yield per unit time. As will be appreciated by those skilled in the art, a scintillator with higher density results in increased absorption of the incident photons by the scintillator. Also, scintillator having higher density results in less scattering of the photons produced by the scintillator and therefore enhances the signal produced by the scintillator.

Further, in certain embodiments of the scintillator composition, A may include a suitable activator ion including cerium, or europium, or praseodymium, or terbium, or ytterbium, or combinations thereof. Typically, an activator ion produces the luminescence by absorption of the electrons and releasing the energy of its excitation as photons of desired wavelengths. As will be appreciated by those skilled in the art, an activator ion gives out light upon being activated by radiation of suitable wavelengths. Accordingly, in certain embodiments where N may include holmium, erbium, thulium, or ytterbium, activator ion such as cerium may not activate these scintillator ions. Hence, it is desirable to have a combination of activator ion and scintillator ion which are mutually amicable. Also, it may be desirable to have N in an amount which facilitates scintillation of the garnet. In an exemplary embodiment, yttrium may be present in an amount less than 10 atomic percent.

Further, in certain embodiments, C and D may be used for combinatorial substitution of aluminum by one or more ions. In certain embodiments, C and D may include a monovalent, or divalent, or trivalent, or tetravalent, or pentavalent ions which may occupy one or both of the two sites having 6 coordination or the three sites having 4 coordination by replacing aluminum in the garnet. In certain embodiments, C or D may be a smaller ion, such as lithium, or magnesium, or gallium, or an element from group IIIa, or IVa, or Va, or IIId transition metal, or IVd transition metal, or combinations thereof. In certain embodiments, the monovalent lithium ion or trivalent boron ion, or tetravalent silicon or germanium ions may occupy 4 coordination site. In some embodiments, the 6 coordination site may be occupied by divalent ions such as magnesium, or beryllium, or zinc. In other embodiments, the 6 coordination site may be occupied by trivalent ions such as scandium, or gallium, or indium. In certain embodiments, the 6 coordination site may be occupied by tetravalent ions such as titanium, or zirconium, or hafnium, or tin. In some embodiments, the 6 coordination site may be occupied by pentavalent ions such as phosphorous, or niobium, or tantalum, or vanadium. In some embodiments, aluminum may be partially substituted by combinatorial substitution which includes a mixture of magnesium and silicon. In these embodiments, magnesium may occupy the 6 coordination site and a combination of aluminum and silicon may occupy the four coordination site. In other embodiments, aluminum may be partially substituted by combinatorial substitution by magnesium and hafnium. In these embodiments, the combination of magnesium and hafnium may occupy 6 coordination sites.

In one exemplary embodiment, M may be lutetium, N may be magnesium, A may be cerium, and C and D may be silicon. In another exemplary embodiment, M may be lutetium, N may be calcium, A may be cerium, and C and D may be silicon. As will be appreciated by those of ordinary skill in the art, a combination of calcium and silicon may be used to preserve the stoichiometry of the garnet by appropriate valence composition. For example, a combination of calcium ion having a 2+ valence state and silicon ion having a 4+ valence state may be used to substitute a pair of lutetium and aluminum ions each having a 3+ valence state.

In some embodiments, the garnet may be represented by $Lu_{3-p}Ce_pAl_{5-q}O_{12}$, such that up to about 30 atomic percent of lutetium may be at least partially substituted by yttrium, or terbium, or gadolinium, or dysprosium, or ytterbium, or combinations thereof. In these embodiment, p ranges from about 0.002 to about 0.05, and q ranges from about 0 to about 0.05. Further, in certain embodiments, the ratio of the sum of atomic percent of lutetium and cerium to that of aluminum may be in a range from about 0.595 to about 0.605. In some of these embodiments, aluminum may be partially substituted by monovalent ions such as lithium, divalent ions such as magnesium or zinc, or trivalent ions such as gallium, or scandium, or indium, or tetravalent ions such as silicon, or germanium, or zirconium, or hafnium, or pentavalent ions such as phosphorous, or vanadium, or combinations thereof. In other embodiments, aluminum may be partially substituted by calcium, or silicon, or combinations thereof. In an exemplary embodiment, aluminum may be substituted by a combination of magnesium and silicon. As will be appreciated by those skilled in the art, substitution of aluminum by a combination of magnesium and silicon enhances transparency of the scintillator.

Referring again to FIG. 1, once the scintillator 22 produces the photons, they are detected by employing a photon detector 24. In some embodiments, the photon counter 24 includes a photodiode configured to convert the photons into respective electronic signals. In some of these embodiments, the photon counter 24 is coupled to a photomultiplier tube to proportionately enhance the signals produced by the photon counter 24. The imaging system 10 then processes this data to construct an image of the internal features within the target 16. Although not illustrated, the radiation detector 20 may employ a collimator for collimating beams directed towards the detector element 20 and, thereby, enhance the absorption percentage of the incident light on the radiation detector 20. In addition, the imaging system 10 of FIG. 1 may include a variety of control circuiting and devices. For example, as illustrated, the radiation detector 20 is coupled to detector acquisition circuitry 26, which controls acquisition of the signals generated in the radiation detector 20. In certain embodiments, the imaging system 10 includes a motor subsystem (not shown) to facilitate motion of the radiation source 12 and/or the detector 20. In these embodiments, image processing circuitry 28 is employed to execute examination of protocols and to process acquired image data from the detector acquisition circuitry 26. These and various other control mechanisms may be incorporated into the imaging system 10 in accordance with certain embodiments of the present technique.

As an interface to the imaging system 10, one or more operator workstations 30 may be included for outputting system parameters, requesting examination, viewing images, and so forth. The operator workstation 30 is configured to enable an operator, via one or more input devices (keyboard, mouse, touchpad, etc.), to control one or more components of the imaging system 10 if necessary. The illustrated operator workstation 30 is coupled to an output device 32, such as a display or printer, to output the images generated during operation of the imaging system 10. In general, displays, printers, operator workstations, and similar devices may be local or remote from the imaging system 10. For example, these interface devices may be positioned in one or more places within an institution or hospital, or in an entirely different location. Therefore, the interface devices may be linked to the image system 10 via one or more configurable networks, such as the internet, virtual private networks, and so forth. These and other input/output devices or interfaces may be incorporated into the imaging system 10 in accordance with embodiments of the present technique.

Figure 2:
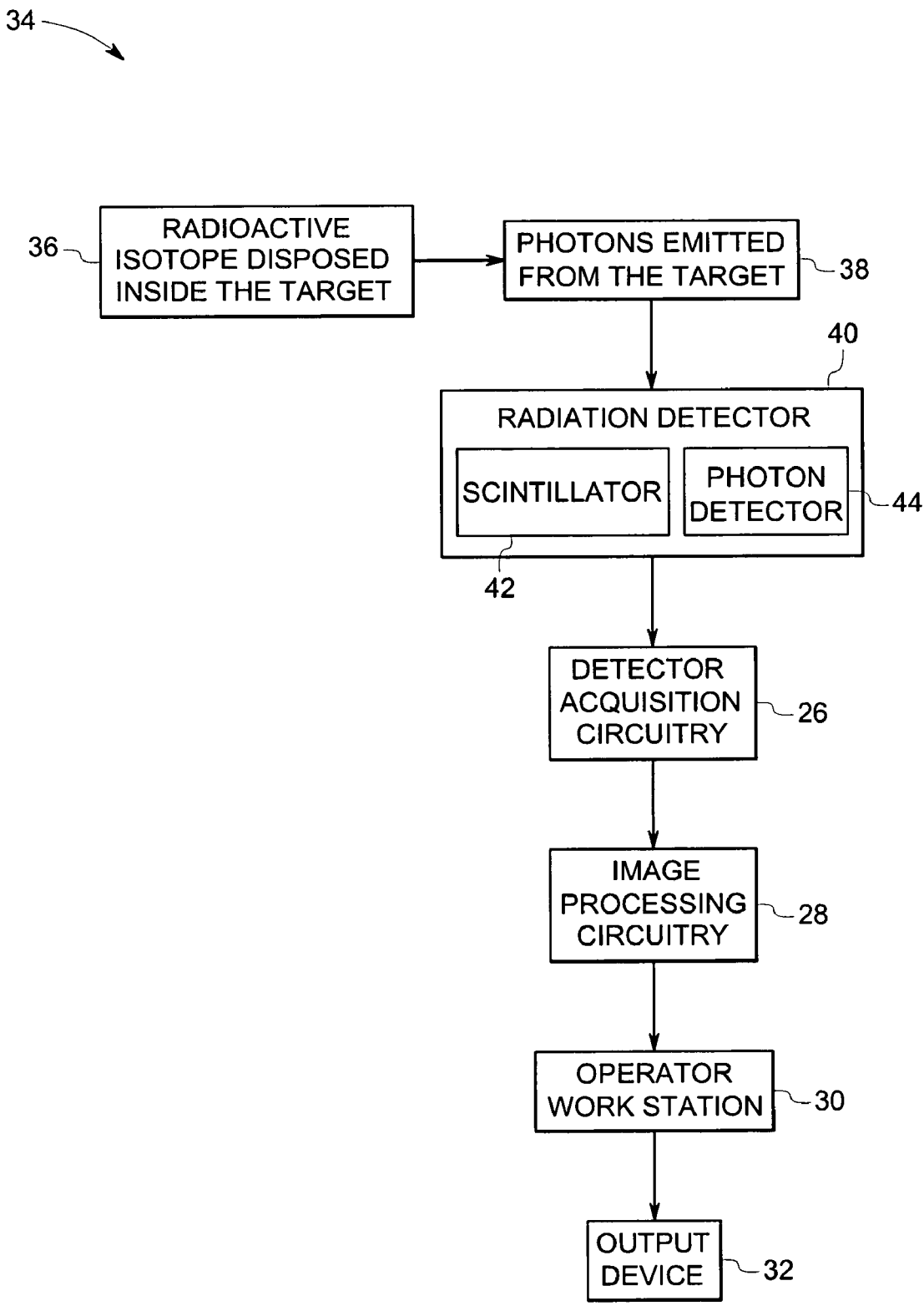
FIG. 2 is a diagrammatical representation of an exemplary positron emission tomography imaging system employing a garnet scintillator according to certain embodiments of the present technique.

FIG. 2 illustrates an exemplary positron emission tomography (PET) imaging system 34 in accordance with certain embodiments of the present technique. In the illustrated embodiment, the PET imaging system 34 includes a radioactive substance 36 disposed within a target. In an exemplary embodiment, the target may be a human with a radioactive isotope injected inside. Typically, the radioactive isotope is administered to desired locations inside a human by tagging it along with a natural body compound, such as glucose, ammonia, water, etc. In general, after the dose of the radioactive isotope is administered inside the target, the radioactive substance, during its lifetime, emits radiation 38 that is detected by the radiation detector 40 (scintillator 42 and photon detector 44). Once inside the target (e.g., body of human), the radioactive substance 36 localizes the radioactivity in the biologically active areas or areas to be detected. In an exemplary embodiment, where the target is a human or an animal, the biologically active area may include a cerebral or cardiac profusion, Alzheimer, Parkinson, epilepsy, hibernating myocardium, cancer, or tumor. Typically, a dose of the radioactive substance 36 includes a radioactive isotope, which emits positrons and is disposed inside a target in a function-specific or tissue-specific manner. As will be appreciated by those skilled in the art and as described in detail below, the positron emitted from the radioactive isotope annihilates by reaction with electrons to produce two photons or two gamma rays each having energy of 511 KeV. These photons then penetrate out of the target and are detected via the radiation detector 40, i.e., PET scanner.

In the illustrated embodiment, the radiation detector or the PET scanner 40 includes a scintillator 42 having the scintillator composition as described above with reference to FIG. 1. Further, the radiation detector 40 includes a photon detector 44, such as a photodiode. Further, the PET imaging system 34 may include detector acquisition circuitry 26, image processing circuitry 28, operator workstation 30, and an output device 32 as described with reference to imaging system 10 of FIG. 1.

As will be appreciated by those skilled in the art, in case of living targets, such as human beings or animals, in order to avoid any adverse affects of the radioactive isotope, it is desirable to administer a minimal amount of the radioactive substance 36 inside the target sufficient to produce a detectable amount of less energy photons. However, lesser energy photons may require scintillators with relatively higher sensitivity, higher density, and higher luminous efficiency. Also, a short decay time may be required to reduce the integration time during the determination of the intensity of the input radiation, so that the image rate for the generation of images and/or projections can be significantly increased. As a result, the occurrence of artifacts, such as shadow image, is reduced. Moreover, examination time is reduced for the patient, because more single images can be measured within a shorter period of time. Also, it is desirable to have a scintillator 42 which has effective stopping power, because the high density of the scintillator 42 facilitates absorption of a relatively greater number of photons without losing them as a result of scattering in the scintillator. In certain embodiments, the density of the scintillator composition may be in a range from about 6 gm/cc to about 8 gm/cc. In some embodiments, the volume fraction of the porosity of the scintillator composition may be in a range from about 0 to about 0.005. In certain embodiments, the light output of the scintillator is in a range from about $5 \times 10^3$ photons per MeV to about $10^6$ photons per MeV.

Figure 3:
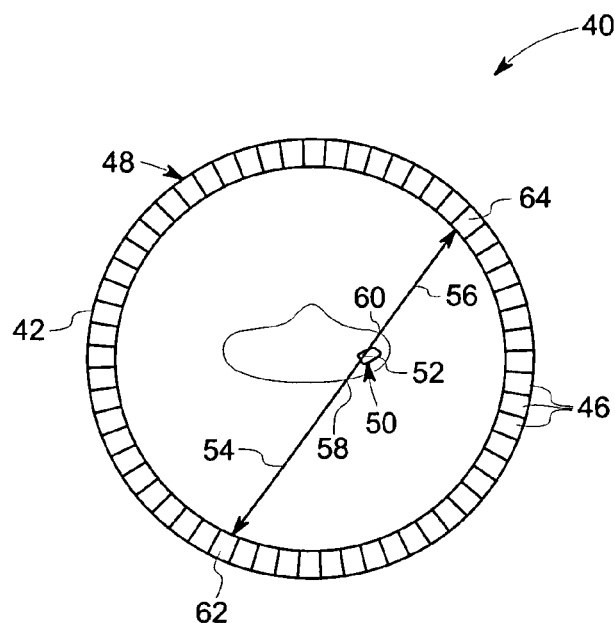
FIG. 3 is a front view of a scintillator ring used in a radiation detector of a positron emission tomography imaging system according to certain embodiments of the present technique.

FIG. 3 is a cross sectional view of the radiation detector 40 employed in a PET imaging system 34 (see FIG. 2) in accordance with certain embodiments of the present technique. In the illustrated embodiment, the radiation detector 40 employs a plurality of detector elements 46. In certain embodiments, the detector elements 46 may be arranged around the target in a configuration such as a cylindrical configuration with a circular cross section, so as to enable the two photons penetrated out of the target to reach any two opposite detector elements located on the scintillator ring 48. In some embodiments, the scintillator ring 48 may include one or more layers of the scintillator 42, which in turn is disposed over a layer including photon detectors 44. In other embodiments, the scintillator 42 may be in a form of pixels, each of which is coupled to a pixel of the photon detector (not shown). In other words, one or more layers having an array formed by the pixels of the scintillator 42 may be disposed over another layer formed by an array formed by the pixels of the photon detector 46.

In the illustrated embodiment, a target having a radioactive isotope localized in a biologically active region 50 is disposed inside the radiation detector 40. As described above, the radioactive isotope upon decay emits a positron. In certain embodiments, the decay is a beta decay. Typically, the emitted positron travels at a very high speed and is usually slowed down to small speeds due to collisions with one or more neighboring atoms. Once the positron is slowed down, the annihilation reaction takes place between the positron and an outer-shell electron of one of the neighboring atoms. As will be appreciated by those skilled in the art, the annihilation reaction produces two 511 KeV photons or gamma rays, which travel in almost exactly opposite directions as shown by arrows 54 and 56 due to conservation of energy and momentum. More specifically, the two detector points along with the origin point 52 of the photon in the biologically active site 50 form a straight line. In other words, the origin point 52 in the biologically active site 50 occurs along a straight line connecting the two detector elements 62 and 64. For example, in the illustrated embodiment, the two photons traveling in the direction shown by the arrows 54 and 56 reach the detector elements 62 and 64 respectively, such that the points 52, 62 and 64 lie on the same straight line. Hence, simultaneous detection of photons on two points of the scintillator ring 48 indicates existence of the radioactive isotope in the desired location, such as a biologically active area in a human target.

Furthermore, for the PET imaging system 34 (see FIG. 2), the energy of the photons as detected by the radiation detector 40 is important to determine that the two photons follow their original trajectory as shown by arrows 52 and 54. For example, the photons may suffer energy losses due to missing the trajectory as a result of scattering, such as Compton or elastic scattering. In certain embodiments, a scatter correction may be employed in the radiation detector 40 to account for elastic scattering. In other embodiments, an energy discriminator may be employed in the radiation detector 40 to account for Compton scattering. Typically, the scattered photons exhibit energy values lower than 511 KeV. As will be appreciated by those skilled in the art, the energy of the photons is determined by the level of the signal from the radiation detector 40. Therefore, it is desirable to have the scintillator 42 back to the normal or ground state while receiving a photon, because if the scintillator 42 is in the excited state while receiving a photon, an energy value of 511 KeV will be unduly determined. Despite the fact that the photon quantum was scattered and has a lower energy value. However, during their travel from the origin 50 to the locations 58 and 60 where they emerge from the target 36, the photons pass through target material, such as tissues in case of humans or animals. Consequently, depending upon the target material some energy is lost in the target material.

In some embodiments, the radiation detector 40 may employ a time-of-flight (TOF) detector. As will be appreciated by those skilled in the art, TOF refers to the transit of the photons from their source in the body to the PET scanner's scintillator ring 48. Typically, in a time-of-flight detector, the detection of a photon by a detector of the detector ring 48 results in the opening of an electronic time window, during which detection of a photon at the other detector of the detector ring 48 results in the counting of a coincidence event. Consequently, not only are the photons detected inside the time window, but also the difference in time-of-flight between the two photons is measured and used to estimate a more probable location of the annihilation point along the line. This reduces the signal to noise ratio and boosts the image quality. Measuring the slight difference in the arrival times of two photons emitted from the same positron with sufficiently good timing resolution determines where along the line the positron was originally located within the target. With current PET technology, the timing resolution is of the order of 4 nanoseconds, which constrains the positron to a 50 cm region. As this region is about the size of the body, the timing resolution of the order of 4 does not add any information regarding the location of the annihilation point in the body. Therefore, it is desirable to improve the accuracy of detection to about 0.5 nanoseconds, which constrains the positron to a 5-cm region. The limits are set by the system's ability to measure a small difference i.e., the time resolution. Embodiments of the disclosed scintillators have a relatively fast rise time, fast decay time, and high light output. In certain embodiments, the rise time of the disclosed scintillator composition ranges from about $10^{-11}$ seconds to about $10^{-8}$ seconds. In some embodiments, the decay time of the disclosed scintillator composition ranges from about $10^{-8}$ seconds to about $6 \times 10^{-8}$ seconds. Further, in some embodiments, the light output of the disclosed scintillator composition ranges from about $5 \times 10^3$ photons per MeV to about $10^6$ photons per MeV. Additionally, embodiments of the disclosed scintillator have a high density, thereby reducing the thickness of the crystal and consequently reducing the scattering of the photons in the crystal. An exemplary measure of the efficacy of the TOF detector is the number density of photons per unit time.

Figure 4:
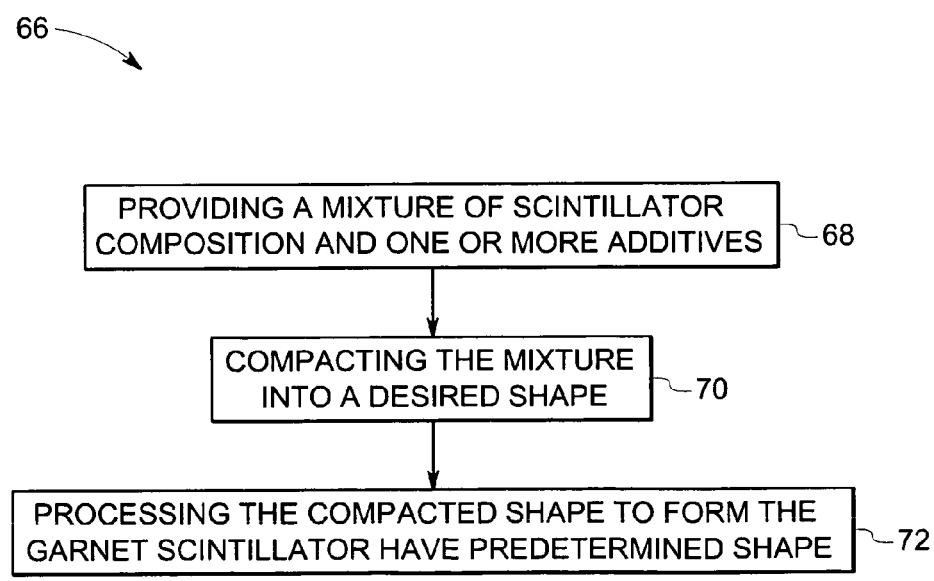
FIGS. 4, 5, 6, 7 and 8 are flow charts illustrating methods for manufacturing a garnet scintillator for use in an imaging system according to certain embodiments of the present technique.

In certain embodiments, the scintillator 42 employed in the detector ring 48 may be formed by using various methods. For example, FIG. 4 is a flow chart illustrating one exemplary process 66 for manufacturing the scintillator composition 42 in accordance with certain embodiments of the present technique. As illustrated, the process 66 begins by providing a mixture of scintillator composition and one or more additives (block 68). In certain embodiments, the act of providing the scintillator composition involves providing a garnet composition as described above. Further, additives such as silica and magnesia may be mixed along with the scintillator composition. In certain embodiments, the additives are used to provide higher density and strength to the final product as described above. The mixture is then compacted into a desired shape (block 70). Following compaction, the compacted shape is then processed to form a garnet scintillator having a predetermined shape (block 72). For example, in certain embodiments, the compacted shape may be subjected to sintering, annealing, pressuringly heating, and the like as described with reference to FIG. 5. In certain embodiments, the compacted shape of the scintillator (after processing) may be subjected to polishing followed by cutting into desired shapes, such as rods. In these embodiments, the desired shapes of the scintillator are then coating with reflector material. For example, the reflector material may be applied on the scintillator pixels in an array of scintillator pixels to avoid any cross talk of light between the pixels. Further, the coated scintillator is then assembled to form a radiation detector.

Figure 5:
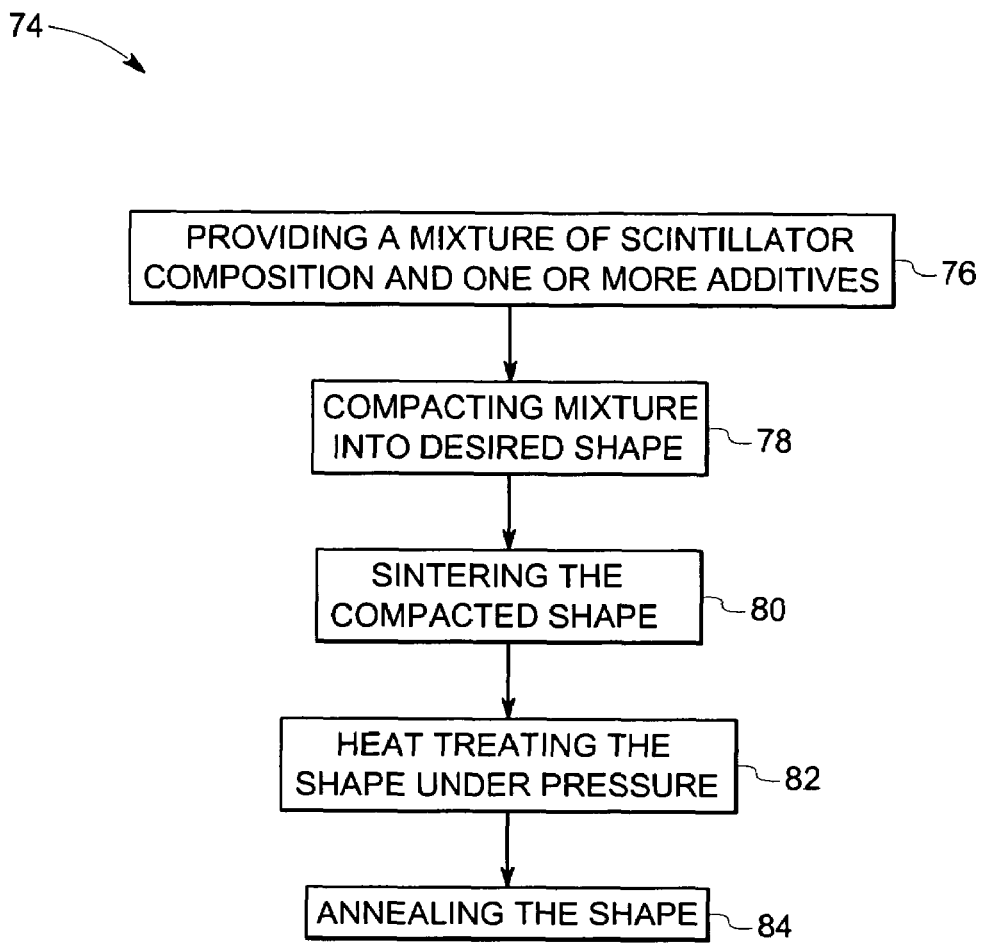

FIG. 5 is a flow chart illustrating an exemplary process 74 of manufacturing a scintillator composition in accordance with embodiments of the present technique. The process 74 begins by providing a precursor mixture of scintillator composition. In an exemplary embodiment, the precursor mixture may include oxides of the elements contributing to the scintillator composition, the amounts of these oxides being selected such that the final composition of the scintillator is achieved after processing. Further, along with the precursor mixture, one or more additives are also provided (block 76). In an exemplary embodiment, the additives may include magnesium or silicon. In certain embodiments, the mixture is compacted to form a desired shape (block 78). In some cases, the compacted shape is sintered to densify the compact form (block 80). In other cases, the compacted shape may be heated under pressure to acquire the desired shape. In certain embodiments, the act of sintering may be performed at an oxygen partial pressure of about $10^{-4}$ Torr to 760 Torr (1 atm). In other embodiments, the act of sintering may be performed in a vacuum having a pressure of less than about $10^{-4}$ Torr. In some embodiments, the act of sintering may be performed in either a wet or a dry hydrogen atmosphere. At block 82, the shape so formed is heat treated under pressure to further densify the shape and to remove any undesired gaseous species trapped inside the compacted shape. In an exemplary embodiment, the shape so formed may be heat treated in a hot isostatic press. In certain embodiments, the shape is heated at a predetermined temperature under a predetermined pressure. In some of these embodiments, the shape may be heated at a predetermined temperature range of 1200° C. to about 2000° C. and a predetermined pressure ranging from about 5 psi to about 45 psi. At block 84, the shape is annealed to equilibrate the activator ion to a predetermined valence state to increase light yield and to decrease absorption. For example, cerium may be used as the activator, and the annealing atmosphere and temperature may be maintained so as to equilibrate cerium to a 3+ valence state. In this embodiment, the annealing is carried out in an oxygen atmosphere. As will be understood by those skilled in the art, cerium in the 3+ valence state acts as an activator ion, producing light in presence of suitable wavelengths of radiation.

Figure 6:
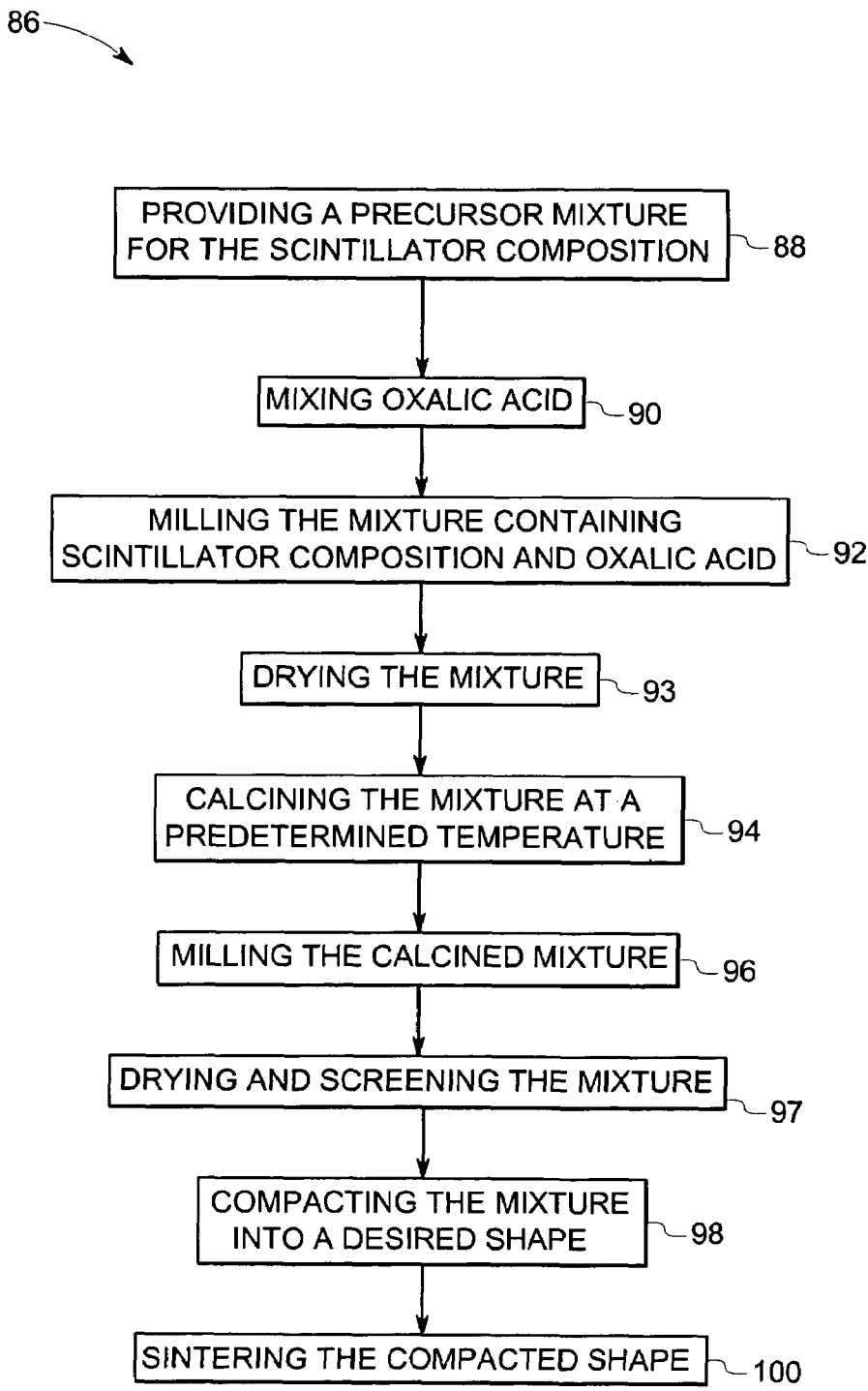

FIG. 6 is a flow chart illustrating an exemplary process of manufacturing the scintillator composition according to embodiments of the present technique. The process 86 begins by providing precursors of the scintillator composition (block 88). In these embodiments, the precursors are chosen such that they are soluble in oxalic acid and form oxalate compounds upon reaction with oxalic acid. In an exemplary embodiment, the precursors may include oxides or carbonates of the metals or elements that contribute to the scintillator composition. In an example of this embodiment, the precursor may include lutetium oxide, aluminum oxide or alumina, and cerium carbonate. The precursor mixture is then allowed to react with oxalic acid (block 90). At block 92, the process 86 of FIG. 6 proceeds by milling the mixture containing the precursors and the oxalic acid to facilitate formation of a homogeneous mixture. At block 93, the mixture obtained is subjected to drying. At block 94, the dried mixture is calcined to eliminate any volatile species. In certain embodiments, the act of calcining involves heating the mixture at a predetermined temperature ranging from about 500° C. to about 1200° C. In some embodiments, calcining may be performed in desired environments such as vacuum, or a reduced environment, or an oxygenated environment. At block 96, the mixture obtained after calcining is subjected to milling once again. As will be appreciated by those skilled in the art, the act of calcining proceeded by milling enhances the homogeneity of a mixture in terms of composition. At block 97, the milled mixture is subjected to drying and screening. At block 98, the mixture is compacted into a desired shape as described above with reference to FIG. 4. At block 100, the compacted shape is subjected to sintering as described above with reference to FIG. 5.

Figure 7:
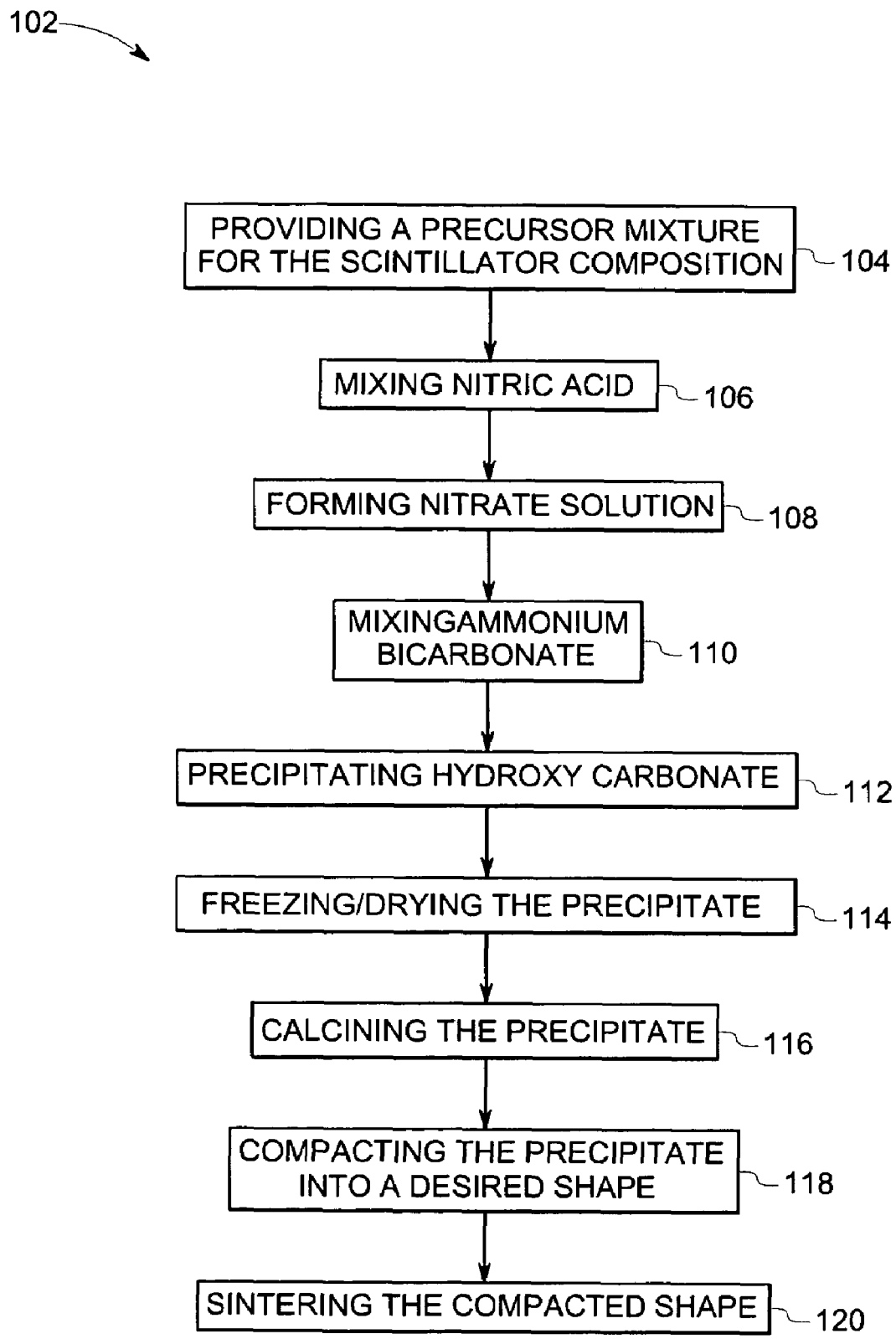

Referring now to FIG. 7, this figure is a flow chart illustrating a process 102 for manufacturing a compact shape of a scintillator composition in accordance with embodiments of the present invention. The process 102 begins at block 104 by providing a precursor mixture of the scintillator composition in powder form. In certain embodiments, the precursor mixture may include oxides and carbonates of the metals/elements forming the scintillator composition which on reaction with nitric acid produce soluble nitrates. At block 106, the process 102 proceeds by mixing nitric acid and, thereby, forming nitrate solution of the precursor mixture. At block 110, ammonium bicarbonate is mixed with the nitrate solution to precipitate hydroxyl carbonates of the metals/elements of the scintillator composition. Once precipitated, the hydroxy carbonates are separated from the solvent by employing freezing or drying processes (block 114). At block 116, the precipitate so obtained is subjected to calcining. At block 118, the precipitate is compacted into a desired shape. At block 120, the compacted shape is subjected to sintering as described above with reference to block 80 of process 74 as shown in FIG. 5.

Figure 8:
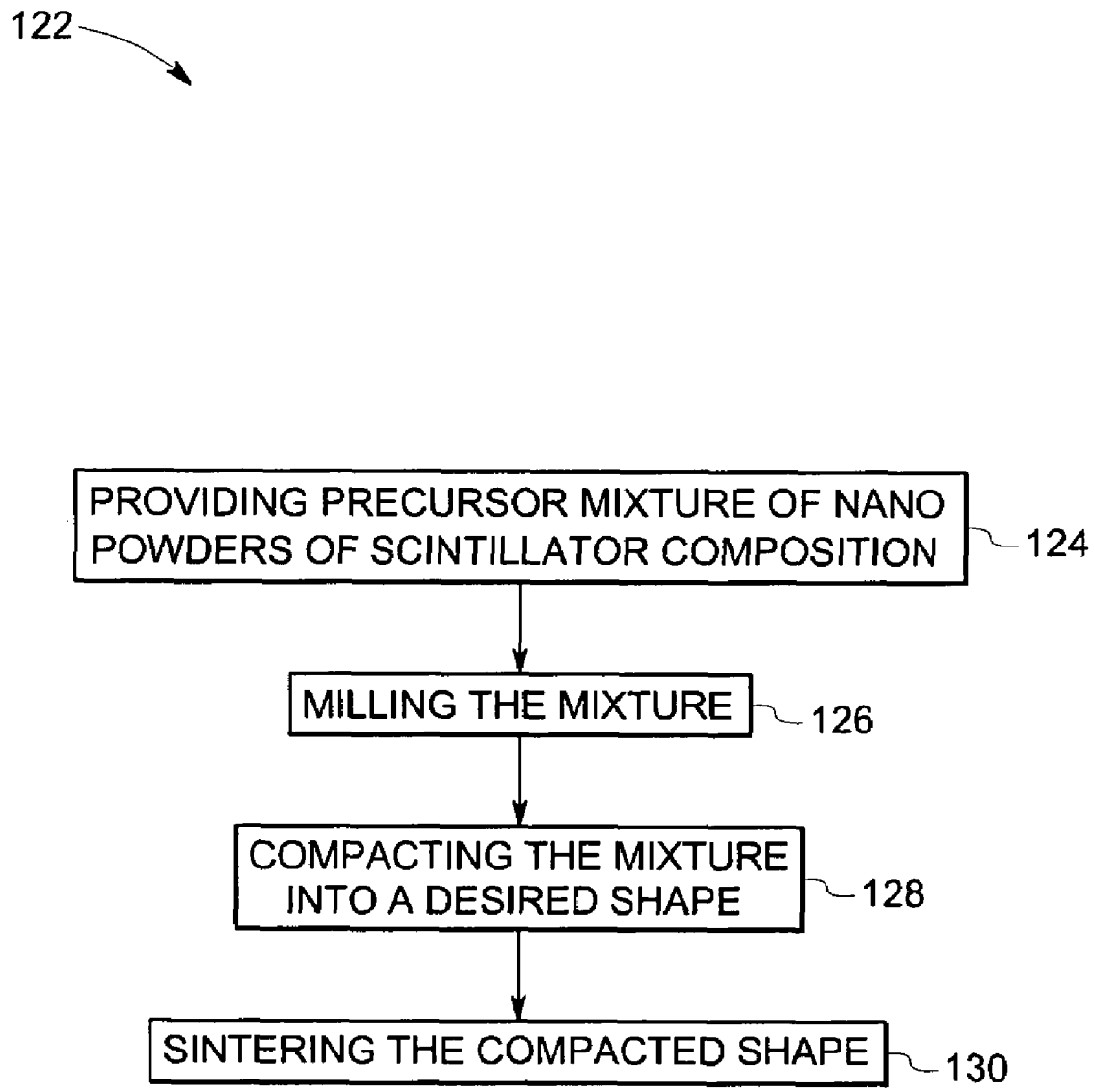

FIG. 8 is a flow chart illustrating a method of manufacturing a garnet scintillator composition by employing nano powders in accordance with embodiments of the present invention. In the illustrated embodiment, the process 122 begins at block 124 by providing oxide precursors of nano powders of the metals/elements in proportionate amounts. At block 126, the precursor mixture is subjected to milling to form a homogeneous mixture of the precursors. At block 128, the calcined mixture is compacted as described above with reference to FIG. 6. At block 130, the compacted shape is subjected to sintering as described above with reference to FIG. 5.

Although, the scintillator composition of the present technique is described with respect to an imaging system, such as PET imaging system, as will be appreciated by those of ordinary skill in the art, this scintillator composition may be used in various other applications which require or benefit from similar properties. For example, the scintillator composition of the present invention may be employed in an application where short decay time is required.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A scintillator composition comprising:
a garnet represented by $(M_{1-x-y}N_xA_y)_3(Al_{5-a-b}C_aD_b)O_{12}$, wherein M comprises yttrium, or terbium, or gadolinium, or holmium, or erbium, or thulium, or ytterbium, or lutetium, or combinations thereof, wherein N comprises additives including an alkali metal, or an alkaline earth metal, or combinations thereof, wherein A comprises a suitable activator ion including cerium, or europium, or praseodymium, or terbium, or ytterbium, or combinations thereof, wherein C or D may comprise lithium, or magnesium, or gallium, or an element from group IIIa, or IVa, or Va, or IIId transition metal, or IVd transition metal, or combinations thereof, wherein x ranges from about 0.001 to about 0.90, y ranges from about 0.005 to about 0.3, and a sum of a and b ranges from about 0.001 to 2.0.

2. The scintillator composition of claim 1, wherein a density of the scintillator composition is in a range from about 6 gm/cc to about 8 gm/cc.

3. The scintillator composition of claim 1, wherein a volume fraction of a porosity of the scintillator composition is in a range 0 to about 0.005.

4. The scintillator composition of claim 1, wherein a light output of the scintillator is in a range from about $5 \times 10^3$ photons per MeV to about $10^6$ photons per MeV.

5. The scintillator composition of claim 1, wherein M comprises lutetium, wherein N comprises calcium, wherein A comprises cerium, and wherein C or D comprises silicon.

6. The scintillator composition of claim 1, wherein M comprises lutetium, wherein A comprises cerium, and wherein C and D comprises silicon and magnesium, respectively.

7. The scintillator composition of claim 1, wherein a ratio of a sum of atomic percent of lutetium and cerium to that of aluminum is in a range from about 0.595 to about 0.605.

8. A method of manufacturing a scintillator composition, the method comprising:
providing a garnet represented by $(M_{1-x-y}N_xA_y)_3(Al_{5-a-b}C_aD_b)O_{12}$, wherein M comprises yttrium, or terbium, or gadolinium, or holmium, or erbium, or thulium, or ytterbium, or lutetium, or combinations thereof, wherein N comprises additives including an alkali metal, or an alkaline earth metal, or combinations thereof, wherein A comprises a suitable activator ion including cerium, or europium, or praseodymium, or terbium, or ytterbium, or combinations thereof, wherein C or D comprise lithium, or magnesium, or gallium, or an element from group IIIa, or IVa, or Va, or IIId transition metal, or IVd transition metal, or combinations thereof, wherein x ranges from about 0.001 to about 0.90, y ranges from about 0.0005 to about 0.30, and a sum of a and b ranges from about 0.001 to 2.0; and
compacting the garnet composition to form a compact form.

9. The method of claim 8, comprising sintering the compact form to densify the compact form.

10. The method of claim 9, comprising annealing the compact form to equilibrate the activator ion to a predetermined valence state to increase light yield and to decrease absorption.

11. The method of claim 9, comprising heat treating the compact form under pressure in a hot isostatic pressure.

12. The method of claim 8, comprising heating the compact form at a predetermined temperature ranging from about 1000° C. to about 2000° C. and under a predetermined pressure ranging from about 5 psi to about 45 psi.

13. The method of claim 8, comprising heating the compact form in an oxidizing atmosphere.

14. A detector element of an imaging system comprising a scintillator composition, the scintillator composition comprising:
a garnet represented by $(M_{1-x-y}N_xA_y)_3(Al_{5-a-b}C_aD_b)O_{12}$, wherein M comprises yttrium, or terbium, or gadolinium, or holmium, or erbium, or thulium, or ytterbium, or lutetium, or combinations thereof, wherein N comprises additives including an alkali metal, or an alkaline earth metal, or combinations thereof, wherein A comprises a suitable activator ion including cerium, or europium, or praseodymium, or terbium, or ytterbium, or combinations thereof, wherein C or D comprise lithium, or magnesium, or gallium, or an element from group IIIa, or IVa, or Va, or IIId transition metal, or IVd transition metal, or combinations thereof, wherein x ranges from about 0.001 to about 0.90, y ranges from about 0.0005 to about 0.30, and a sum of a and b ranges from about 0.001 to 2.0.

15. The detector element of claim 14, wherein the detector comprises a positron emission tomography detector.

16. The detector element of claim 14, comprising a time of flight mode configured to measure a difference in time-of-flight between two photons produced by annihilation.

17. An imaging system, comprising:
a scintillator composition, comprising:
a garnet represented by $(M_{1-x-y}N_xA_y)_3(Al_{5-a-b}C_aD_b)O_{12}$, wherein M comprises yttrium, or terbium, or gadolinium, or holmium, or erbium, or thulium, or ytterbium, or lutetium, or combinations thereof, wherein N comprises additives including an alkali metal, or an alkaline earth metal, or combinations thereof, wherein A comprises a suitable activator ion including cerium, or europium, or praseodymium, or terbium, or ytterbium, or combinations thereof, wherein C or D comprise lithium, or magnesium, or gallium, or an element from group IIIa, or IVa, or Va, or IIId transition metal, or IVd transition metal, or combinations thereof, wherein x ranges from about 0.001 to about 0.90, y ranges from about 0.0005 to about 0.3, and a sum of a and b ranges from about 0.001 to 2.0.

18. The imaging system of claim 17, wherein the imaging system is a positron emission tomography system.

19. The scintillator composition of claim 1, wherein x ranges from about 0.05 to about 0.75.

20. The scintillator composition of claim 1, wherein N comprises sodium, or potassium, or rubidium, or cesium, or calcium, or strontium, or barium, or combinations thereof.

21. The scintillator composition of claim 1, wherein C or D comprise a monovalent ion, or a divalent ion, or a trivalent ion, or a tetravalent ion, or a pentavalent ion, or combinations thereof.

* * * * *